(12) United States Patent
Sidler

(10) Patent No.: US 8,235,355 B2
(45) Date of Patent: Aug. 7, 2012

(54) SLIDE VALVE, IN PARTICULAR FOR BLOCKING A LINE CONVEYING MEDIA

(75) Inventor: Hans-Jörg Sidler, Eschenbach (CH)

(73) Assignee: SISTAG AG Absperrtechnik, Eschenbach (CH)

( * ) Notice: Subject to any disclaimer, the term of this patent is extended or adjusted under 35 U.S.C. 154(b) by 81 days.

(21) Appl. No.: 12/748,551

(22) Filed: Mar. 29, 2010

(65) Prior Publication Data

US 2011/0049409 A1    Mar. 3, 2011

(30) Foreign Application Priority Data

Apr. 2, 2009 (CH) ........................................ 0540/09

(51) Int. Cl.
*F16K 25/00* (2006.01)
(52) U.S. Cl. .................... 251/204; 251/195; 251/326
(58) Field of Classification Search .................. 251/195, 251/203, 204, 326, 327
See application file for complete search history.

(56) References Cited

U.S. PATENT DOCUMENTS

| | | | |
|---|---|---|---|
| 3,743,244 A * | 7/1973 | Dickenson et al. ........... 251/197 |
| 3,917,223 A | 11/1975 | Sidler et al. | |
| 4,279,402 A | 7/1981 | Wey et al. | |
| 4,314,579 A * | 2/1982 | Wheatley et al. ............. 137/312 |
| 4,522,224 A | 6/1985 | Stadler et al. | |
| 4,546,788 A | 10/1985 | Stadler et al. | |
| 4,646,777 A | 3/1987 | Stadler et al. | |
| 4,742,990 A | 5/1988 | Stadler et al. | |
| 5,013,009 A * | 5/1991 | Nelson .......................... 251/357 |
| 5,291,912 A * | 3/1994 | Comeaux ........................ 137/14 |
| 5,549,278 A | 8/1996 | Sidler | |
| 6,010,112 A | 1/2000 | Sidler | |
| 7,014,164 B2 | 3/2006 | Sidler | |
| 7,946,556 B1 | 5/2011 | Trott | |
| 2010/0224815 A1 | 9/2010 | Sidler | |
| 2011/0001076 A1 | 1/2011 | Sidler | |

* cited by examiner

*Primary Examiner* — John Fristoe, Jr.
(74) *Attorney, Agent, or Firm* — Brian Roffe

(57) ABSTRACT

A slide valve, in particular for blocking a line conveying media, is provided with a multi-part housing (2) having a passage opening (3). Disposed in this housing (2) are two slider plates (4, 5), parallel to one another, moveable at right angles to the passage opening (3), and which can be moved from an open position into a closed position tightly blocking the passage opening (3) by means of a common drive mechanism (10). Means are provided for connecting the two slider plates (4, 5) to one another and to the drive mechanism (10), and which in the closed position allow a pre-determined relative movement of the slider plates (4, 5) in relation to one another in their direction of movement. Thus, even with tolerance deviations with regard to the slider plates and/or their counter-surfaces, a long-lasting blocking function of both slider plates is guaranteed.

20 Claims, 3 Drawing Sheets

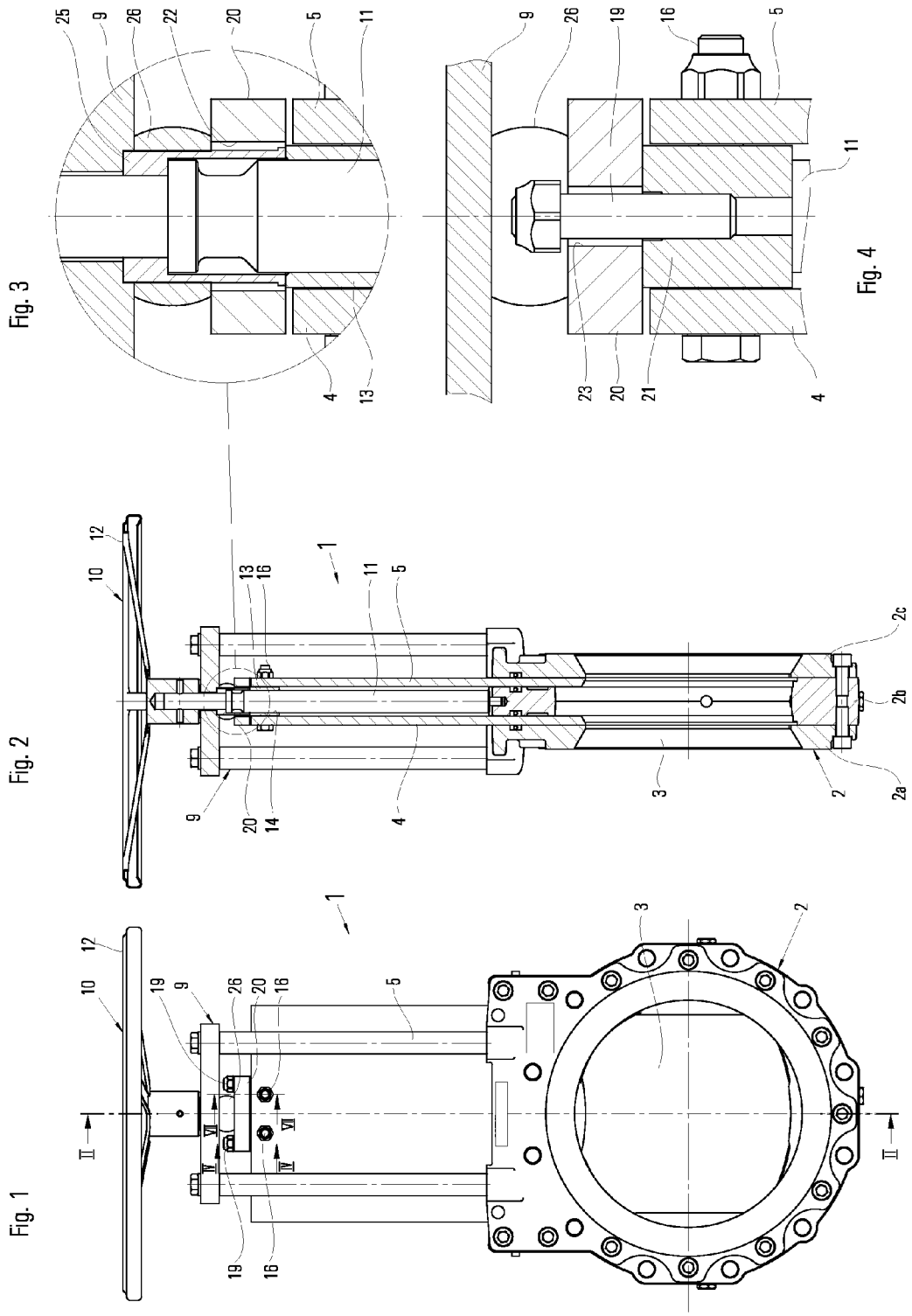

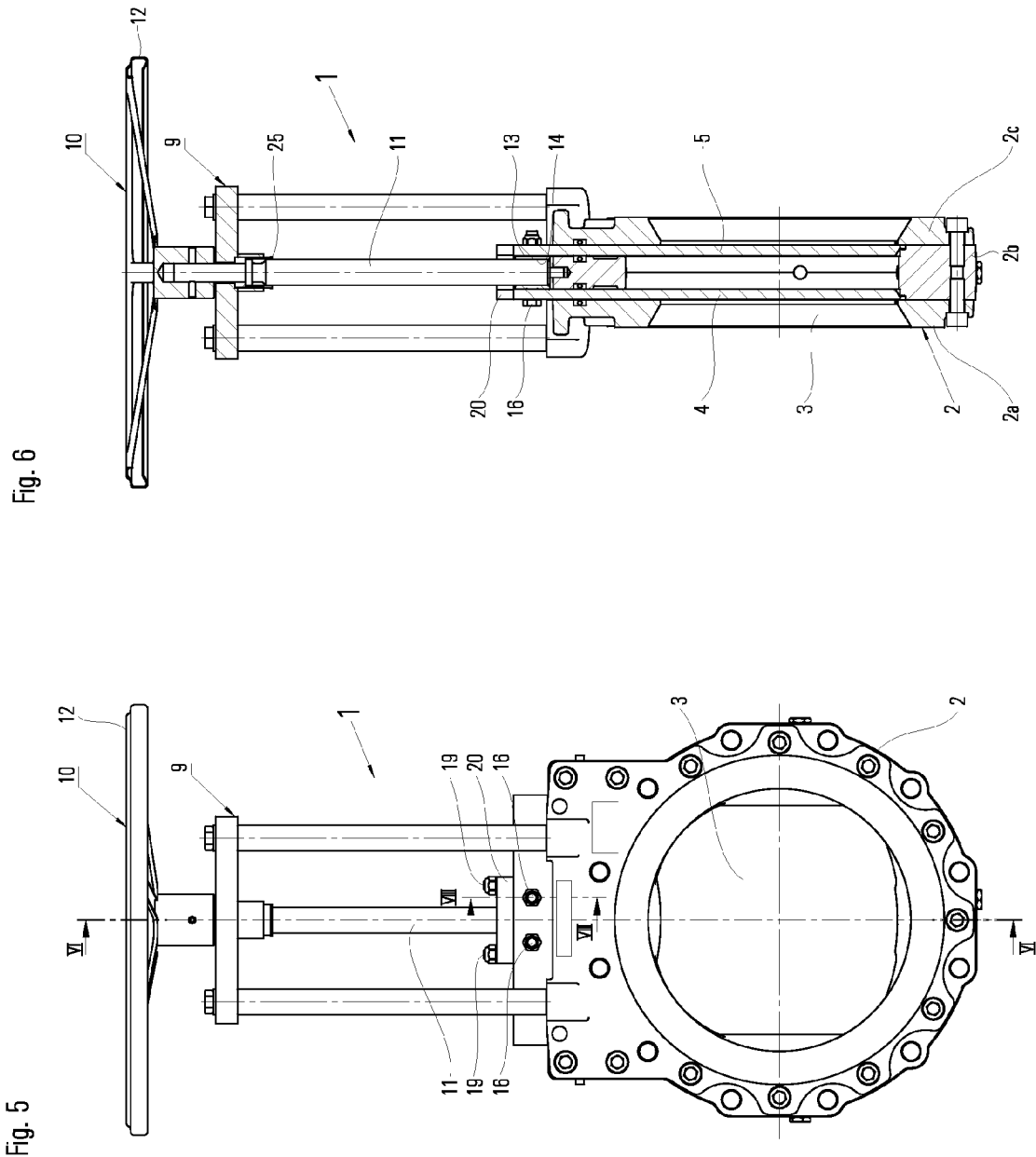

SLIDE VALVE, IN PARTICULAR FOR BLOCKING A LINE CONVEYING MEDIA

FIELD OF THE INVENTION

The invention relates to a slide valve, in particular for blocking a line conveying media, according to the preamble to Claim 1.

BACKGROUND OF THE INVENTION

Slide valves comprising a multi-part housing having a passage opening and comprising two slider plates, parallel to one another, moveable at right angles to the passage opening are known. The two slider plates are connected to one another rigidly and can be moved from an open position into a closed position tightly blocking the passage opening by means of a common drive mechanism. With these slide valves it may be the case that over time only one of the two slider plates rests tightly against the corresponding counter-surface of the housing in the closed position, and so performs the blocking function by itself.

OBJECTS AND SUMMARY OF THE INVENTION

The object forming the basis of the present invention is to provide a slide valve of the type specified at the start wherein a correct blocking function is guaranteed over a longer period of time.

This object is achieved according to the invention by a slide valve having the features of Claim 1.

Further preferred embodiments of the slide valve according to the invention form the subject matter of the dependent claims.

Since according to the invention means are provided for connecting the two slider plates to one another and to the drive mechanism and which in the closed position allow a pre-determined relative movement of the slider plates in relation to one another in their direction of movement, even with inaccuracies as regards the slider plates and/or their counter-surfaces within a specific tolerance range a correct blocking function of the two slider plates is guaranteed despite there being a single common drive for their movement.

BRIEF DESCRIPTION OF THE DRAWINGS

In the following the invention is described in greater detail by means of the drawings using an exemplary embodiment. These show as follows:

FIG. 1 is a front view of a slide valve according to the invention in the open position;

FIG. 2 is a section along line II-II in FIG. 1;

FIG. 3 is a part of FIG. 2 in an enlarged scale;

FIG. 4 is a section along line IV-IV in FIG. 1;

FIG. 5 is a front view of the slide valve in a closed position;

FIG. 6 is a section along line VI-VI in FIG. 5;

DETAILED DESCRIPTION OF THE INVENTION

Figure 7:
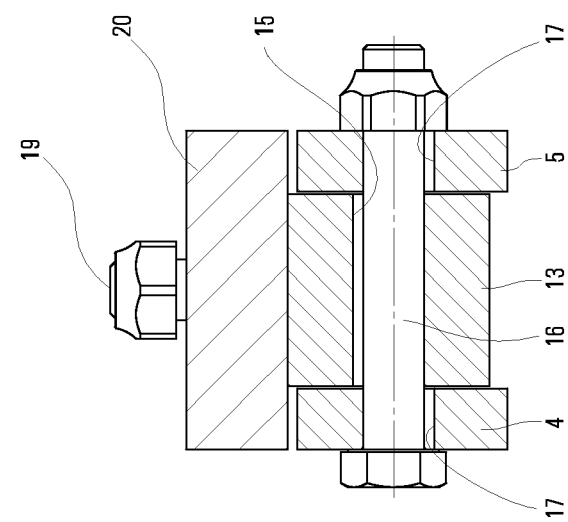
FIG. 7 is a section along line VII-VII in FIG. 1 in an enlarged scale.

In FIG. 1 and FIG. 2 a slide valve 1 is illustrated which is particularly suitable for blocking a line conveying media, the media possibly being liquid or gaseous materials or also solids, for example fuels, chemical liquids, sewage and many others.

The slide valve 1 has a housing 2 with a passage opening 3. With the exemplary embodiment shown, the housing 2 is comprised of three parts 2a, 2b, 2c joined together (FIG. 2). In the housing 2 two slider plates 4, 5, parallel to one another, are mounted moveably at right angles to the passage opening 3, and can be moved from an open position, as shown in FIGS. 1 and 2, into a closed position, as shown in FIG. 5 and FIG. 6, blocking the passage opening 3 tightly by means of a common drive mechanism 10. In this closed position the two slider plates 4, 5 and the housing 2 form a closed chamber 28 into which a sealing medium can be introduced through a hole 29, as indicated, or any medium flowing into this chamber 28 if there is a leak can be sucked out.

Figure 8:
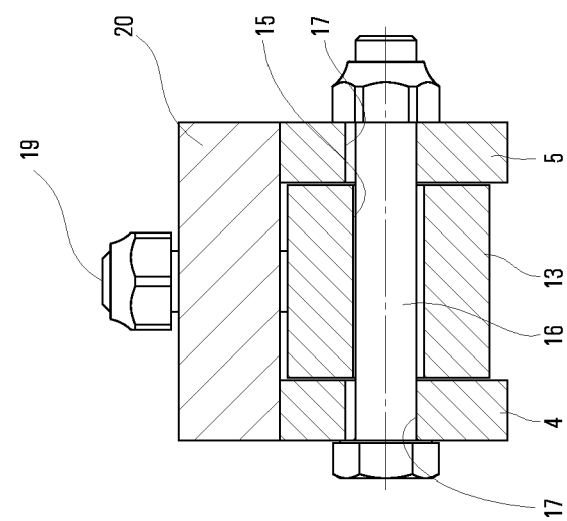
FIG. 8 is a section along line VIII-VIII in FIG. 5 in an enlarged scale, with a retaining plate in a straight position.
Figure 9:
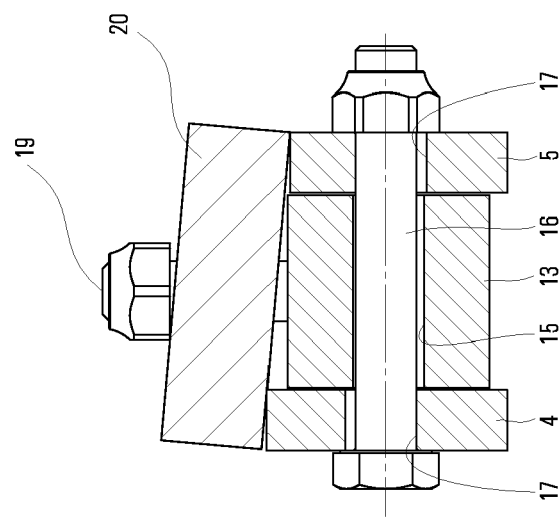
FIG. 9 is an illustration corresponding to FIG. 8 with the retaining plate in an inclined position.

The drive mechanism 10 comprises a drive spindle 11 which is mounted rotatably on the one hand in a holder 9 secured to the housing and on the other hand in the central housing part 2b and is connected to a manually operable drive wheel 12. The drive spindle 11 acts together with a spindle nut 13 which is disposed between the two slider plates 4, 5. The spindle nut 13 has a central threaded hole 14 (FIGS. 2 and 6) for the drive spindle 11 and preferably two openings 15, as can be seen in FIGS. 7 to 9, for connecting bolts 16 by means of which the two slider plates 4, 5 are connected to one another and to the spindle nut 13 and to the whole drive mechanism 10. Advantageously, these openings 15 lie to both sides of the threaded hole 14 and extend at right angles to the latter. Here the connecting bolts 16 project with a pre-determined play through the openings 15 in the spindle nut 13 and also through openings 17 in the slider plates 4, 5 (see FIGS. 7 to 9). The connecting bolts 16 are advantageously in the form of through bolts.

Furthermore, the spindle nut 13 is provided with preferably two guide bolts 19 for a retaining plate 20 extending parallel to the threaded hole 14. Said guide bolts can, for example, be screwed into corresponding holes 21 in the spindle nut 13 (FIG. 4). The retaining plate 20 is provided with a central opening 22 (FIG. 3) for the drive spindle 11 and a respective opening 23 (FIG. 4) advantageously disposed to both sides of the latter for the respective guide bolt 19. These openings 22, 23 are designed such that it is possible to position the retaining plate 20 at an angle to the spindle nut 13. The axes of the guide bolts 19 lie in a plane parallel to the slider plates 4, 5.

In the open position of the slide valve 1 the spindle nut 13 is in its uppermost position on the drive spindle 11 and on the front side rests against a casing 25 secured to the holder (FIG. 3). The retaining plate 20 lies on top of the spindle nut 13 (see in particular FIGS. 3, 4 and 7). Between the retaining plate 20 and the holder 9 a damper 26 is provided which during operation inhibits or eliminates any vibrations occurring and moreover reduces wear of the spindle nut, the drive spindle and the corresponding bearings.

As shown by FIG. 7, the connecting bolts 16 "carrying" the slider plates 4, 5 are supported with their lower region in the openings 15 of the spindle nut 13 and in the lower region play is provided between the connecting bolts 16 and the openings 17 in the slider plates 4, 5. Front-side play is also provided between the retaining plate 20 and the upper surfaces of the slider plates 4, 5. The two slider plates 4, 5 are thus held in their uppermost position and the passage opening 3 is fully opened.

By operating the drive wheel 12 the spindle nut 13 on the drive spindle 11, and with it also the slider plates 4, 5, are moved downwards until, in the ideal case, the slider plates 4, 5 both come to rest simultaneously on corresponding counter-surfaces of the housing 2. The connecting bolts 16 are now raised above the openings 17 in the slider plates 4, 5 now acting from below within the openings 15 of the spindle nut 13 until they rest with their upper region in the spindle nut openings 15. The retaining plate 20 released from the spindle nut 13 lies straight on both slider plates 4, 5 and holds them in the closed position (FIG. 8).

If, however, due to production tolerances or, for example, if because one of the two slider plates 4, 5 or one of the two counter-surfaces of the housing 2 becomes worn, one of the slider plates, e.g. slider plate 4 according to FIG. 9, comes to rest earlier than the other slider plate 5 upon closure, the connecting bolts 16 are raised above the openings 17 in the slider plate 4 now acting from below within the openings 15 in the spindle nut 13 until they rest with their upper region in the spindle nut openings 15, this movement being allowed within the framework of the pre-determined play of the openings 17 of the other slider plate 5, and the connecting bolts 16 also coming to rest with their upper region in these openings 17. The retaining plate 20 released by the spindle nut 13 lies at an angle on the two slider plates 4, 5 and holds them in the closed position (FIG. 9).

Since according to the invention in the closed position a pre-determined relative movement of the two slider plates 4, 5 in their direction of movement is possible, even with inaccuracies regarding the slider plates and/or their counter-surfaces a correct blocking function of both slider plates is guaranteed within a specific tolerance range despite a single common drive for their movement.

The invention is sufficiently illustrated with the exemplary embodiment described. It could of course also be illustrated by other variations. Therefore, instead of a manually operable drive mechanism, a piston/cylinder unit with a piston rod could also be provided instead of this drive spindle.

However, this type of drive spindle and a hand wheel with a thread could also be provided. Upon turning the hand wheel the drive spindle with the slider plates (without rotation) would be moved upwards and downwards.

The invention claimed is:

1. A slide valve, comprising:
   a multi-part housing having a passage opening and comprising two slider plates, parallel to one another, moveable at right angles to the passage opening,
   a common drive mechanism that moves the slider plates between an open position and a closed position blocking the passage opening, and
   means for connecting the two slider plates to one another and to the common drive mechanism and which, when the slider plates are in their closed position, allow movement of each of the slider plates relative to the other one of the slider plates in a direction that is the same direction as the slider plates are moved by the common drive mechanism between their open and closed positions.

2. The slide valve according to claim 1, wherein the drive mechanism comprises a drive spindle and a spindle nut disposed between the two slider plates, the means for connecting the two slider plates to one another and to the drive mechanism being formed by at least one connecting bolt, the respective connecting bolt projecting with pre-determined play through a respective opening in the respective slider plate and through an opening in the spindle nut extending at right angles to a threaded hole for the drive spindle.

3. The slide valve according to claim 2, wherein
   the spindle nut is provided with two guide bolts for a retaining plate extending parallel to the threaded hole for the drive spindle,
   in the closed position said guide bolts rest on the two slider plates,
   the retaining plate includes an opening for the drive spindle and at least two openings for the guide bolts, and
   a diameter of the openings is larger by a pre-determined amount than a diameter of the guide bolts so that in the closed position the retaining plate are positionable at an angle in relation to the spindle nut.

4. The slide valve according to claim 3, wherein two guide bolts are provided to both sides of the threaded hole for the drive spindle, the axes of the two guide bolts lie in a plane parallel to the slider plates.

5. The slide valve according to claim 4, wherein in the closed position, the two slider plates and the housing form a closed chamber.

6. The slide valve according to claim 3, further comprising a damper arranged between the retaining plate and a holder fitted to an upper side of the housing.

7. The slide valve according to claim 6, wherein in the closed position, the two slider plates and the housing form a closed chamber.

8. The slide valve according to claim 3, wherein in the closed position, the two slider plates and the housing form a closed chamber.

9. The slide valve according to claim 2, wherein in the closed position, the two slider plates and the housing form a closed chamber.

10. The slide valve according to claim 2, wherein the at least one connecting bolt comprises two connecting bolts.

11. The slide valve according to claim 2, wherein
    the spindle nut is provided with at least one guide bolt for a retaining plate extending parallel to the threaded hole for the drive spindle,
    in a closed position the at least one guide bolt rests on the two slider plates,
    the retaining plate has an opening for the drive spindle and at least one opening for the at least one guide bolt, and
    the diameter of the at least one opening is larger by a pre-determined amount than a diameter of the at least one guide bolt so that in the closed position the retaining plate is positionable at an angle in relation to the spindle nut.

12. The slide valve according to claim 1, wherein in the closed position, the two slider plates and the housing form a closed chamber.

13. The slide valve according to claim 1, wherein the housing includes counter-surfaces against which the slider plates rest when in the closed position, the counter-surfaces of the housing defining in part the passage opening of the housing that extends.

14. The slide valve according to claim 1, wherein the slide valve is configured to block a line conveying media.

15. The slide valve according to claim 1, wherein the drive mechanism comprises:
    a drive spindle; and
    a spindle nut arranged between the two slider plates and having a threaded hole that engages with the drive spindle,
    the means for connecting the two slider plates to one another and to the drive mechanism comprising first and second connecting bolts, the first connecting bolt passing through aligning openings in the slider plates and through an aligning opening in the spindle nut, the second connecting bolt passing through aligning openings in the slider plates and through an aligning opening in the spindle nut, the openings in one slider plate through which the first and second connecting bolts pass being situated on one side of the threaded hole of the spindle nut and the openings in the other slider plate through which the first and second connecting bolts pass being situated on an opposite side of the threaded hole.

16. The slide valve according to claim 15, wherein the openings in the slider plates extend at right angles to the threaded hole.

17. The slide valve according to claim 15, wherein the openings in the slider plates and the spindle nut are configured relative to the first and second connecting bolts such that the first and second connecting bolts project with a pre-determined play through the openings in the slider plates and the spindle nut, whereby a diameter of the first and second connecting bolts is less than diameters of the openings in the slider plates and spindle nut.

18. A slide valve, comprising:
a housing having a through passage defined in part by counter-surfaces;
two slider plates arranged parallel to one another;
a common drive mechanism that moves said slider plates between an open position in which media is able to flow through said passage and a closed position blocking said passage, said slider plates being movable such that, when in the closed position, said slider plates rest against said counter-surfaces that define said passage of said housing; and
connecting means for connecting said slider plates to one another and to said common drive mechanism, said connecting means allowing, when said slider plates are in their closed position, movement of each of said slider plates relative to the other one of said slider plates in a direction that is the same direction as said slider plates are moved by said common drive mechanism between their open and closed positions.

19. The slide valve according to claim 18, wherein said housing is a multi-part housing including a central housing part defining said counter surfaces.

20. A slide valve, comprising:
a housing having a passage opening, said housing including a central housing part, a first additional housing part arranged on one side of said central housing part and a second additional housing part arranged on another side of said central housing part;
a first slider plate that is movable between said first additional housing part and said central housing part;
a second slider plate that is movable between said second additional housing part and said central housing part such that said second slider plate is separated from said first slider plate by said central housing part, said second slider plate being parallel to said first slider plate;
a common drive mechanism that moves said first and second slider plates relative to said central housing part and said first and second additional housing parts and between an open position in which media is able to flow through said passage opening and a closed position blocking said passage opening; and
connecting means for connecting said first and second slider plates to one another and to said common drive mechanism, said connecting means allowing, when said first and second slider plates are in their closed position, movement of each of said first and second slider plates relative to the other one of said first and second slider plates in a direction that is the same direction as said first and second slider plates are moved by said common drive mechanism between their open and closed positions.

* * * * *